United States Patent [19]

Johnson

[11] Patent Number: 4,875,885
[45] Date of Patent: Oct. 24, 1989

[54] ENGINE NOISE SIMULATING DEVICE FOR A BICYCLE

[76] Inventor: Horton Johnson, 186 Hazel Ave., Highland Park, Ill. 60035

[21] Appl. No.: 108,687

[22] Filed: Oct. 15, 1987

[51] Int. Cl.$^4$ ............................ A63H 5/00; B60Q 5/00
[52] U.S. Cl. .................................... 446/189; 446/404; 446/418; 116/56; 116/61; 280/304.2
[58] Field of Search ............... 446/188, 189, 194, 195, 446/196, 204, 205, 213, 216, 270, 404, 409, 411, 412, 418, 397, 405, 420; 116/56, 58 R, 59, 61; 74/55, 56, 569; 280/1.14, 289 R, 289 D

[56] References Cited

U.S. PATENT DOCUMENTS

| | | | |
|---|---|---|---|
| 618,107 | 1/1899 | Kraushaar | 116/61 |
| 1,066,461 | 7/1913 | Austin | 116/61 |
| 2,434,516 | 1/1948 | Persons et al. | 116/56 |
| 2,462,718 | 2/1949 | Brun | 116/61 |
| 2,620,764 | 12/1952 | Cook | 116/56 |
| 2,889,711 | 6/1959 | Morris | 74/56 X |
| 3,054,377 | 9/1962 | Scott | 116/61 |
| 3,374,685 | 3/1968 | Eheim | 74/56 |
| 3,559,333 | 2/1971 | Manzo | 116/61 X |

FOREIGN PATENT DOCUMENTS 1158801  5/1985  U.S.S.R. ................... 74/56

OTHER PUBLICATIONS

Russell C. Ball, Jr., "Rotary to Linear Motion," Apr. 2, 1962, pp. 68-73, Product Engineering.

*Primary Examiner*—Mickey Yu
*Attorney, Agent, or Firm*—Price, Heneveld, Cooper, DeWitt & Litton

[57] ABSTRACT

A noisemaker for bicycles and the like includes a housing having a shoulder and a resonator plate seated in the housing on the shoulder. The resonator plate is biased against the shoulder by a compressed spring. A resonator chamber extends from the shoulder, away from the housing. Use of a camming mechanism raises the resonator plate above the shoulder and releases same as it passes so that the resonator plate is urged back against the shoulder by the spring and a surface-engaging noise and air compression noise are directed into the resonator chamber to simulate the sound commonly associated with a vehicle engine.

24 Claims, 2 Drawing Sheets

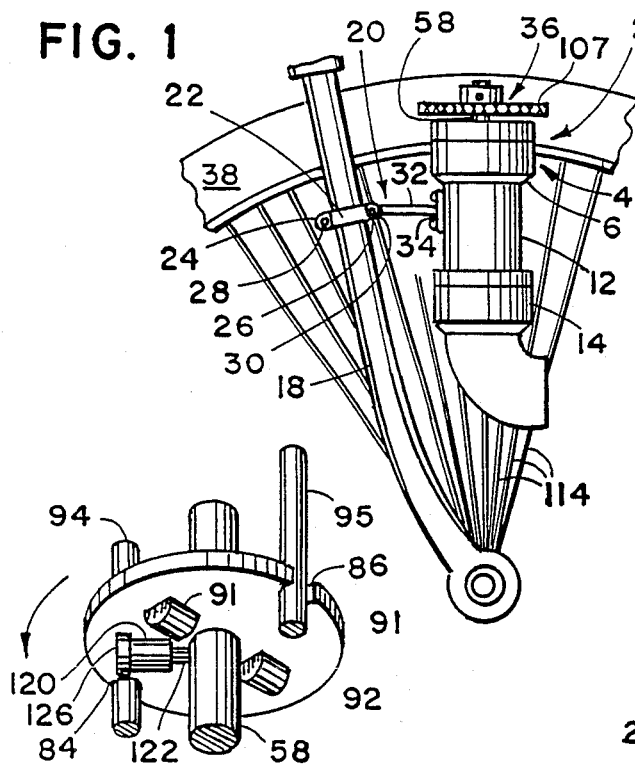
FIG. 1
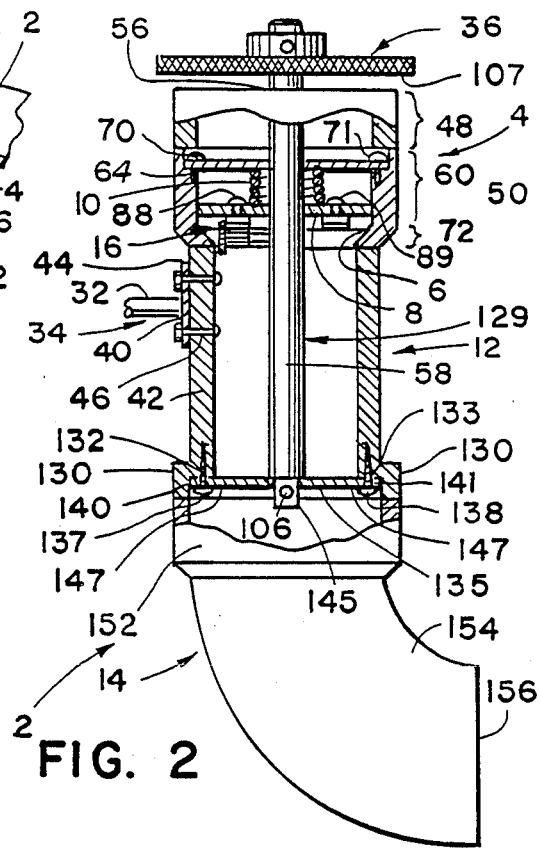
FIG. 2
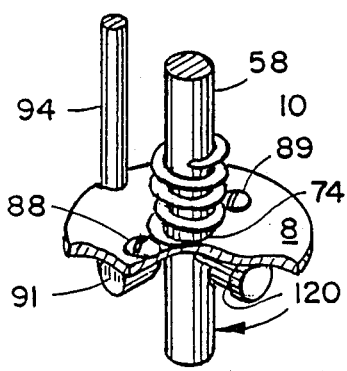
FIG. 5
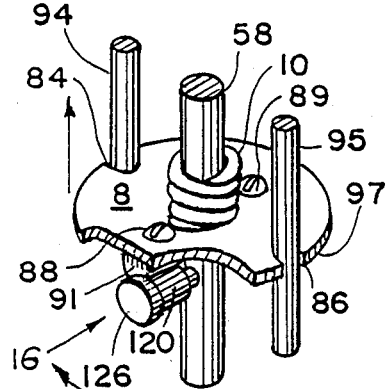
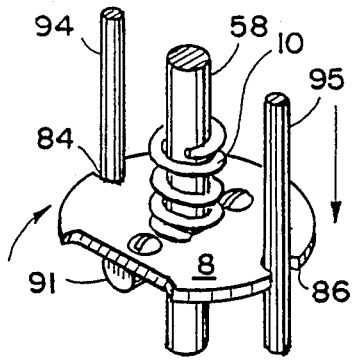
FIG. 6A   FIG. 6B   FIG. 6C
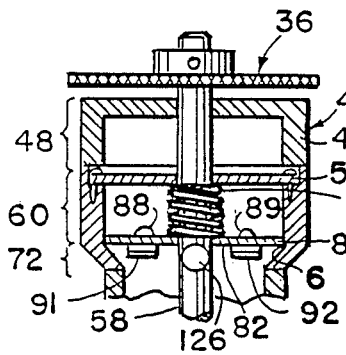
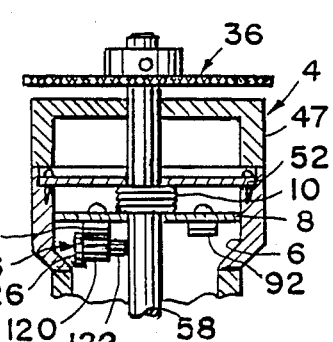
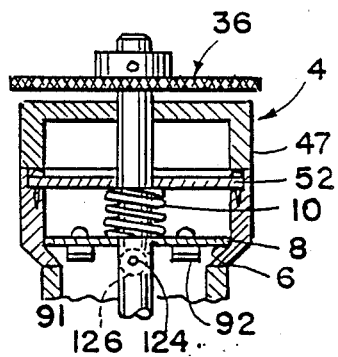
FIG. 4A   FIG. 4B   FIG. 4C

ENGINE NOISE SIMULATING DEVICE FOR A BICYCLE

BACKGROUND OF THE INVENTION

The present invention relates to noisemakers, and more particularly to an engine simulating device for bicycles and the like.

Motor simulation devices have amplified noises created by periodic impacting of a hammer against a metal sound plate or diaphragm, periodic stretching and releasing of a diaphragm, the pressing of tines or rods against the rotating spokes of the bicycle, etc. In light of the advancements in engine technology, many of these devices no longer simulate the noise currently associated with a motorbike or the like. Moreover, many of the bicycle noisemakers heretofore comprised a distinct system for driving the noisemaker, requiring varying degrees of coordination between the drive system and the noisemaking system. The typical bicycle noisemaker is noncompact, and frequently, due to the inclusion of many parts and connectors, difficult for even an average adult, let alone a child, to install and service.

Thus, there is a demand for a simply-constructed bicycle noisemaker that is both integrated into a single compact unit and readily installed with a minimum amount of effort. At the same time, it is important that the compact unit maintain an integrity of design such that realistic engine noises are produced and quality control maximized.

SUMMARY OF THE INVENTION

The noisemaker of the present invention comprises a housing including a shoulder and a resonator plate in the housing biased against the shoulder. A resonator chamber extends from the shoulder, away from the housing. Means are provided for raising the plate above the shoulder and releasing same so that a surface-engaging noise and air compression noise are directed into the resonator chamber to simulate the sound commonly associated with a vehicle engine.

Due to its uncomplicated construction, the noisemaker is particularly economical to manufacture, efficient to use, and convenient to store as well as ship. The noisemaker is designed to be easy enough for a child to install, and yet sophisticated enough to realistically simulate a vehicle engine, so that the bicycle noisemaker is well adapted for the proposed use.

BRIEF DESCRIPTION OF THE DRAWINGS

FIG. 1 is a fragmentary, schematic view of a bicycle with perspective views of a noisemaker embodying the present invention and a bracket holding the noisemaker to the bicycle;

FIG. 2 is a side elevational view of the noisemaker in partial section;

FIG. 4A is a partial cross-sectional view of the noisemaker with a resonator plate resting on a shoulder;

FIG. 4B is a partial cross-sectional view of the noisemaker with the resonator plate raised by a cam roller;

FIG. 4C is a partial cross-sectional view of the noisemaker with the resonator plate returned to the rest position as depicted in FIG. 4A;

FIG. 5 is a partial perspective view of an underside portion of the resonator plate;

FIG. 6A is a partial, broken away perspective view of the resonator plate as biased by a spring, and the camming mechanism;

FIG. 6B is a partial, broken away perspective view of the resonator plate being raised by the camming mechanism; and FIG. 6C is a partial, broken away perspective view of the resonator plate in a resting position subsequent to being cammed by the camming mechanism.

DETAILED DESCRIPTION OF THE PREFERRED EMBODIMENTS

Figure 3:
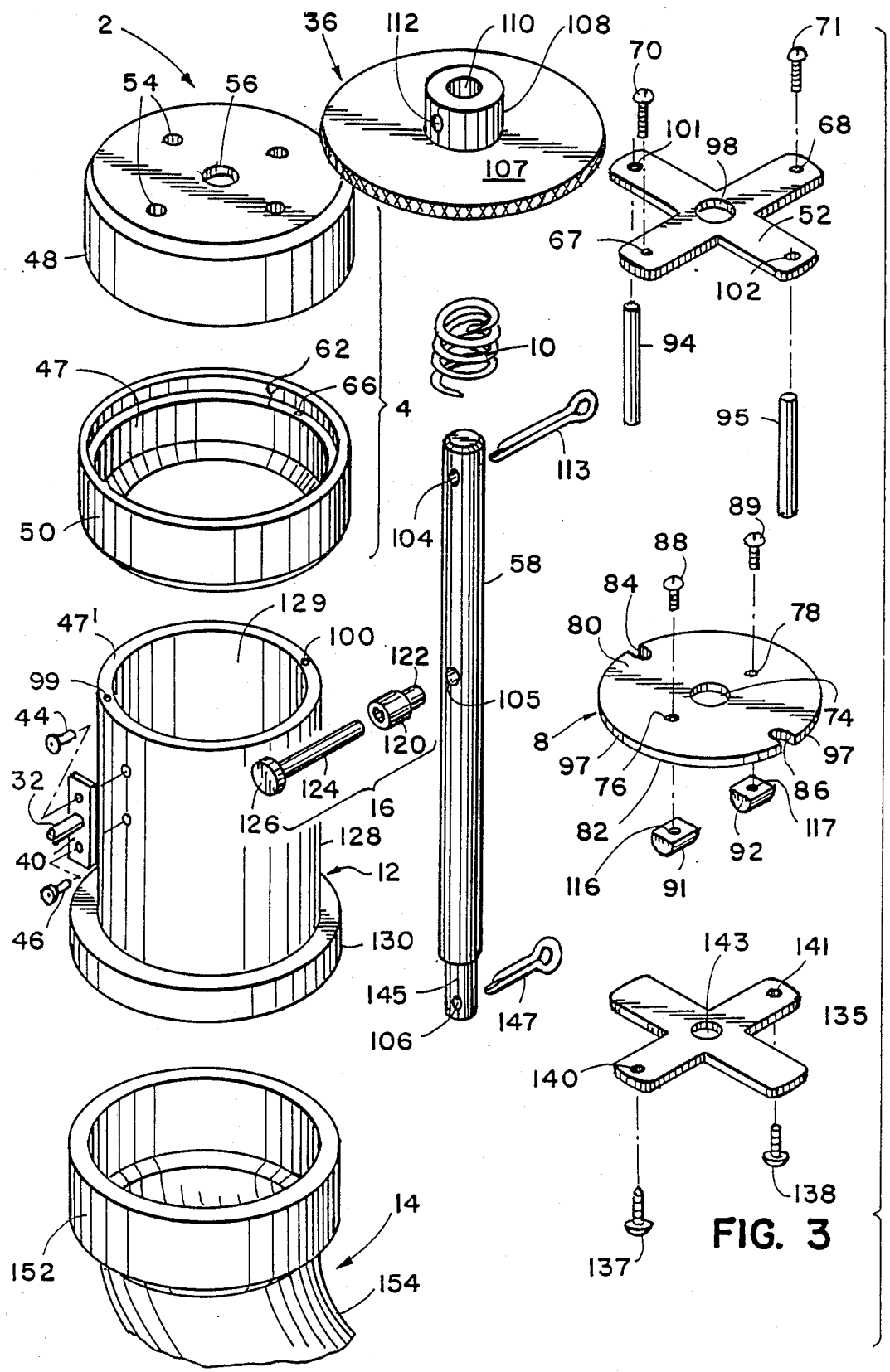
FIG. 3 is an exploded view of the noisemaker.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and procedures illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting.

The noisemaker 2 of the preferred embodiment (FIG. 1) comprises a housing 4 including a shoulder 6 (FIG. 2) and a resonator plate 8 biased against shoulder 6 within housing 4 by employment of a compressed spring 10. A resonator chamber 12 extends from the shoulder 6, away from housing 4, and terminates into a directional horn 14. Use of a camming assembly 16, driven by drive wheel 36, allows for the raising of resonator plate 8 and releasing of same so that a surface-engaging noise and air compression noise are directed into the resonator chamber 12 to simulate the sound commonly associated with a vehicle engine.

Noisemaker 2 is attached to one leg of a front fork 18 (FIG. 1) of a conventional bicycle (not shown) via adjustable bracket 20. A clamping portion 22 of bracket 20 is affixed to fork 18 by nut and bolt assemblies 24 and 26 (partially shown) which are received by first and second bracket apertures 28 and 30, respectively. An adjustable bar 32 links clamping portion 22 with mount 34. Bar 32 should be adjustable so that a drive wheel 36 of noisemaker 2 can be aligned to frictionally engage a front tire 38 of the bicycle. Nonetheless bar 32 could be conventionally welded to clamping portion 22 during manufacturing for use on most standard bicycles and drive wheel 36 could be positioned with respect to tire 38 by manipulating clamping portion 22 along fork 18.

Adjustable bar 32 of bracket 20 is integrally connected to mount 34 which is connected to resonator chamber 12 (FIG. 2). Mount 34, as illustrated, comprises a plate 40, which in turn is secured to resonator chamber wall 42 with rivets 44 and 46.

Except for drive wheel 36 and a small portion of drive shaft 58, the noisemaking mechanism of noisemaker 2 is contained within housing 4, resonator chamber 12 and directional horn 14 (FIGS. 1 and 2). Housing 4, resonator chamber 12 and directional horn 14 are preferably constructed from plastic, though other materials would be suitable. As illustrated in FIG. 3, housing 4 comprises two members 48 and 50 that are conventionally connected together with an adhesive, such as PVC glue, or other suitable means, subsequent to construction of the noisemaking mechanism within noisemaker 2. By constructing the housing 4 from two members 48 and 50, rather than one, it is possible to affix resonator plate 8, a bearing plate 52, and a spring 10, as described below, into housing 4 before connecting the members 48 and 50 to form housing 4.

Upper member 48 (FIG. 2) includes a first wheel aperture 56 for receiving drive shaft 58. Drive shaft 58 extends through first housing aperture 56 (FIG. 3), and is operatively connected to drive wheel 36. Upper member 48 further includes one or more venting apertures 54 for cooling the noisemaker 2 as it generates heat through the noisemaking process. An upper portion 60 (FIGS. 2 and 3) of lower member 50 includes a concentric indented section 62 of housing wall 47 in which bearing plate 52 is seated for journaling drive shaft 58 in aperture 98 therein. Bearing plate 52 is secured on the base rim of indented section 62 by suitable fasteners, e.g., 70, 71 passing through apertures 67 and 68.

The housing wall 47 diverges at a lower section 72 of lower piece 50 to form shoulder 6. The angle of divergence at the shoulder 6 should be great enough so that the resonator plate 8, having a diameter that is just slightly less than that of housing 4 at upper portion 60, is firmly seated at the top of shoulder 6 as best demonstrated in FIG. 4A.

Resonator plate 8 should be thick enough to create a clearly audible noise when it is forced on top of shoulder 6 from a distance shortly thereabove. Additionally, upper surface 80 of resonator plate 8 (FIG. 3) is rubber-coated so that the above-mentioned noise is slightly suppressed. Experimentation has proven that this sort of suppression aids in conforming the noise, which is eventually amplified, as discussed below, to that of a more expensive motorbike.

Resonator plate 8 (FIG. 3) is slidably positioned on drive shaft 58 (FIG. 6A). It is held against rotation by guide rods 94 and 95 which are received in guide slots 84 and 86. Cam followers 91 and 92 are secured to and project downwardly below the lower surface 82 of resonator plate 8 (FIG. 4A).

Guides 94 and 95 are received by guide slots 84 and 86, respectively, which are disposed along an edge portion 97 of resonator plate 8 as best demonstrated in FIGS. 3 and 6B. Guides 94 and 95 are mounted into guide mount apertures 99 and 100 located in resonator chamber wall 47 (FIG. 3). Consequently as resonator plate 8 is raised above shoulder 6, the plate 8 is maintained in a substantially horizontal position providing that resonator plate 8 is not raised beyond the lengths of guides 94 and 95.

Resonator plate 8 is biased downward by coil spring 10 and bearing plate 52 (FIGS. 3 and 4A). Spring 10 is compressed between fixed bearing plate 52 and resonator plate 8, and is coiled around drive shaft 58 (FIG. 4A). Spring 10 should possess enough compression force to firmly hold resonator plate 8 against shoulder 6, but should not possess so much tensional force that resonator plate 8 cannot be easily raised by employment of the camming mechanism 16. Biasing of resonator plate 8 could be achieved through alternative means such as substituting either a hydraulic spring or semi-rigid material between plates 8 and 52 for spring 10. It is particularly noteworthy that the drive shaft 58 is integrated throughout noisemaker 2 since drive shaft 58 extends from a point at which it is attached to the drive wheel 36, through bearing plate aperture 98, spring 10, first resonator plate aperture 74, and ultimately into the resonator chamber 12. As best demonstrated in FIG. 3, drive shaft 58, which in the preferred embodiment is steel, or any other durable material, includes first, second and third shaft apertures 104, 105 and 106 for further unifying the shaft 58 with the noisemaker 2.

Drive wheel 36 (FIG. 3) comprises a conventional wheel portion 107, which may be composed of rubber or any material suitable for frictionally engaging the front tire 38, and a mounting member 108 including first and second wheel apertures 110 and 112. Drive shaft 58 is received by first wheel aperture 110, and is secured by inserting a cotter pin 113 through first shaft aperture 104 and second wheel aperture 112 once they have been suitably aligned. Drive wheel 36 should have a diameter that is greater than that of the noisemaker 2 so that the same is spaced apart from bicycle spokes 114 and front tire 38 (FIG. 1). Moreover, the thickness of drive wheel 36 must be great enough so that the same suitably engages the front tire 38 for an even turn of the drive wheel 36.

Rotation of wheel 36 and drive shaft 58 rotates camming assembly 16. Camming assembly 16 (FIG. 3) comprises cylindrical cam roller 120 and cylindrical cam spacer 122 mounted on cam shaft 124. One end of cam shaft 124 has an oversized retainer knob 126 which holds roller 120 and spacer 122 in place. The other end of cam shaft 124 is received and secured in second shaft aperture 105 of drive shaft 58 by welding or the like. Drive shaft 58 is constructed so that upon securing the same in noisemaker 2, camming assembly 16 is situated within the same plane as cam followers 91 and 92 (FIG. 5). Accordingly when camming assembly 16 is rotated by drive shaft 58, it engages cam follower 91 as demonstrated in FIGS. 4A-4C and FIGS. 6A-6C. Cam follower 91, which is identical to cam follower 92, should be constructed so that as the cam roller 120 engages either, it freely rides over cam roller 120 thus causing the resonator plate 8 to rise upward (FIGS. 4B and 6B). As demonstrated by FIGS. 4B and 6B, the rising resonator plate is fixed against rotation by the rigidly affixed guides 94 and 95, and the spring 10 is further compressed with respect to its resting position of either FIGS. 4A and 6A. After cam roller 120 has passed by either of the cam followers 91 or 92 resonator plate 8 returns to its resting position at the top of shoulder 6. As the resonator plate 8 slides down the guides (FIGS. 6B and 6C) and impacts shoulder 6 (FIGS. 4B and 4C) the resulting noise is directed into resonator chamber 12. Continued rotation of the drive shaft 58 provides for further camming which, in turn, allows for a periodic repetition of the above-mentioned noise. It is this repetition that primarily affords the simulated engine noise that is common to motorbikes and the like. Additionally, by rubber-coating the upper surface 80 of resonator plate 8, and using a plastic rather than metal shoulder 6, the noise is further modulated to provide a truly engine-like sound, in contrast to the simple impacting of metal against metal, as encountered in much of the prior art.

Resonator chamber 12 is cylindrical, having a hollow interior 129 and a lip 130 (FIGS. 2 and 3). The diameter of chamber 12 is the same as that of the housing 4 at the bottom of shoulder 6. The top of chamber 12 is sealably affixed to the bottom of housing 4 using a conventional adhesive, such as PVC glue, or any other suitable means, so that the resonator plate 8 and shoulder 6 set directly above hollow interior 129 of chamber 12. Shaft 58 extends through hollow interior 129 of chamber 12 and is received in a second bearing plate 135 (FIGS. 2 and 3). Second bearing plate 135 has a cross shape in plan view, and is mounted in wall 47' of the resonator chamber 12 on concentric ledge portion 147 of lip 130 using two conventional round head screws 137 and 138. Second bearing plate 135 includes aperture 143 (FIG. 3) for receiving an end portion 145 of the drive shaft 58. Except for end portion 145, which includes aperture 106, drive shaft 58 has a greater diameter than bearing plate aperture 143. Consequently only end portion 145 is actually received by bearing plate aperture 143, and that portion of shaft 58 directly above end portion 145 abuts the second bearing plate. Cotter pin 147 extending through shaft aperture 106 vertically positions shaft 58.

Sealably affixed to lip 130 of chamber 12 is directional horn 14 (FIGS. 2 and 3), which, in the preferred embodiment, comprises a lip portion 152, sound directing portion 154 and sound aperture 156. Lip 130 of chamber 12 and lip portion 152 of horn 14 are sealably connected by use of a conventional adhesive, such as PVC glue. Sound directing portion 154 is curved with respect to resonator chamber 12, so that the plane coincidental with sound aperture 156 assumes a substantially vertical orientation. The vertical orientation of sound aperture 156 causes the noise emanating therefrom to be directed forward so that bystanders can readily hear the noisemaker 2 as the user approaches driving his bicycle or the like. Alternatively, lip 152 could be affixed to resonator chamber 12 so that the noise emanating from sound aperture 156 could be directed in other directions.

Due to the construction of noisemaker 2, it is easy to manufacture, convenient to install, and effective in simulating noise associated with a motorbike or the like. Coordination of the compressed spring 10 with the camming mechanism 16 allows for efficient generation of both surface engagement and air compression noises. By using a plastic housing 4 in conjunction with a metal resonator plate 8 that has been rubber-coated on its upper surface 80, it is possible to simulate a smoother sounding noise that many associate with a finer motorbike. In essence, the noisemaker 2 has a simple and effective design that allows for efficient, as well as realistic, simulation of engine noise.

In the foregoing description, it will be readily appreciated by those skilled in the art that modifications may be made to the invention without departing from the concepts disclosed herein.

The embodiments of the invention in which an exclusive property or privilege is claimed are defined as follows:

1. A noisemaker for bicycles and the like comprising:
   a housing including a shoulder;
   a resonator plate seated in said housing on said shoulder;
   spring means for resiliently biasing said plate against said shoulder;
   a resonator chamber extending from said shoulder, away from said housing;
   drive and cam means for periodically raising said plate above said shoulder against the resilient bias of said spring means and for releasing said plate for movement back into contact with said shoulder, whereby a surface-engaging noise and air compression noise are directed into said resonator chamber to simulate the sound commonly associated with a vehicle engine, said drive and cam means including a drive shaft rotatably mounted on said housing, a drive wheel fixed to said shaft, and a cam fixed to said shaft and engagable with said plate upon rotation of said shaft.

2. A noisemaker as set forth in claim 1, wherein said drive and cam means further includes:
   at least one cam follower positioned along an underside portion of said plate.

3. A noisemaker for bicycles and the like comprising:
   a housing including a shoulder;
   a resonator plate seated in said housing on said shoulder;
   means for biasing said plate against said shoulder;
   a resonator chamber extending from said shoulder, away from said housing;
   means for periodically raising said plate above said shoulder and releasing said plate whereby a surface-engaging noise and air compression noise are directed into said resonator chamber to simulate the sound commonly associated with a vehicle engine, wherein said means for periodically raising said plate above said shoulder and releasing said plate include:
   at least one cam follower positioned along an underside portion of said plate;
   means for both periodically raising said cam follower upward and releasing said cam follower;
   an aperture in said resonator plate;
   a drive shaft extending through said resonator plate aperture;
   means for rotating said drive shaft;
   a cam operatively connected to said drive shaft by a cam shaft; and
   said cam being positioned so that upon each rotation of said drive shaft said cam follower is impacted by said cam, thus urging said cam follower upward to provide for said raising, and allowing said cam follower to fall back to engagement with said shoulder as said cam passes the cam follower.

4. A noisemaker as set forth in claim 3, wherein:
   said cam follower assumes the shape of a cylinder split in half longitudinally having a flat surface and a rolled surface;
   means for mounting said flat surface of said cam follower to the underside portion of said resonator plate.

5. A noisemaker as set forth in claim 4, wherein said means for rotating said drive shaft includes:
   a drive wheel operatively connected to said drive shaft;
   means for rotating said drive wheel whereby said drive shaft is rotated in accordance with said drive wheel.

6. A noisemaker as set forth in claim 5, wherein said means for rotating said drive wheel includes:
   said drive wheel frictionally engaging a rotatable tire.

7. A noisemaker as set forth in claim 6, wherein said means for biasing includes:
   a spring;
   means for compressing said spring against said resonator plate.

8. A noisemaker as set forth in claim 7, wherein said means for compressing said spring against said resonator plate includes:
   a bearing plate disposed above said spring and said resonator plate;
   means for affixing said bearing plate is said housing so that said spring is compressingly interposed between said bearing plate and said resonator plate.

9. A noisemaker as set forth in claim 8, wherein:

said housing shoulder is constructed of plastic; and said resonator plate is constructed of metal whereby said surface-engaging noise and air compression noise are modulated to simulate a sound commonly associated with a well-tuned motorbike engine.

10. A noisemaker as set forth in claim 9, wherein:

said resonator plate includes an upper surface and a lower surface; and said upper surface is coated with a layer of rubber to further modulate said surface-engaging noise and air compression noise.

11. A noisemaker as set forth in claim 10, wherein:

said bearing plate includes an aperture;

said spring comprises a coil;

said drive shaft extending through said bearing plate aperture, said spring coil, and said resonator plate thereby integrating said means for biasing said resonator plate into a compact unit.

12. A noisemaker as set forth in claim 11, further comprising:

a second bearing plate disposed remote from said resonator plate, said second bearing plate being located within said resonator chamber;

an aperture within said second bearing plate receiving said drive shaft;

means for positioning said drive shaft at both said drive wheel and said second aperture whereby said drive shaft is axially aligned between said drive wheel and said second aperture for further stability.

13. A noisemaker as set forth in claim 12, further comprising:

means for securing said noisemaker to a bicycle adjacent a bicycle tire whereby said noisemaker can be mounted on the bicycle to frictionally engage said drive wheel with said bicycle tire.

14. A noisemaker as set forth in claim 13 whereby said means for securing said noisemaker to a bicycle includes:

an adjustable bracket connected to said resonator chamber whereby upon mounting said bracket to the bicycle said noisemaker can be aligned to insure said contiguous contact of said drive wheel to the bicycle tire.

15. A noisemaker as set forth in claim 3, wherein said means for biasing includes:

a spring;

means for compressing said spring against said resonator plate.

16. A noisemaker as set forth in claim 15, wherein said means for compressing said spring against said resonator plate includes:

a bearing plate disposed above said spring and said resonator plate;

means for affixing said bearing plate to said housing so that said spring is compressingly interposed between said bearing plate and said resonator plate.

17. A noisemaker as set forth in claim 16, wherein:

said bearing plate includes an aperture;

said spring comprises a coil;

said drive shaft extending through said bearing plate aperture, said spring coil, and said resonator plate thereby integrating said means for biasing said resonator plate into a compact unit.

18. A noisemaker as set forth in claim 17, further comprising:

a second bearing plate disposed remote from said resonator plate, said second bearing plate being located within said resonator chamber;

an aperture within said second bearing plate receiving said drive shaft;

means for positioning said drive shaft at both said drive wheel and said second aperture whereby said drive shaft is axially aligned between said drive wheel and said second aperture for further stability.

19. A noisemaker as set forth in claim 1, wherein:

said resonator plate includes an upper surface and a lower surface;

said upper surface is coated with a layer of rubber to further modulate said surface-engaging noise and air compression noise.

20. A noisemaker as set forth in claim 19, wherein:

said housing shoulder is constructed of plastic;

said resonator plate is constructed of metal whereby said surface-engaging noise and air compression noise are modulated to simulate a sound commonly associated with a well-tuned motorbike engine.

21. A noisemaker for bicycles and the like, comprising:

a resonator chamber including a shoulder thereon;

a resonator plate seated along said shoulder;

at least one cam follower positioned along an underside portion of said resonator plate;

means for biasing said resonator plate against said shoulder;

cam means for periodically pushing said cam follower upward causing said resonator plate to be correspondingly raised above said shoulder and released as said cam passes whereby said resonator plate is urged back into engagement with said shoulder by said biasing means to create a surface engagement noise and an air compression noise which are directed into said resonator chamber to simulate the sound commonly made by an engine and wherein said cam means includes:

an aperture in said resonator plate;

a drive shaft extending through said resonator plate aperture;

means for rotating said drive shaft;

a cam roller operatively connected to said drive shaft by a cam shaft; and said cam roller being positioned so that upon each rotation of said drive shaft said cam follower is impacted by said cam roller, thus urging said cam follower upward to provide for said raising, and said cam follower is released when not being impacted by said roller.

22. A noisemaker as set forth in claim 21, including:

a drive wheel operatively connected to said drive shaft for engaging a bicycle tire;

whereby said drive shaft is rotated by said drive wheel.

23. A noisemaker as set forth in claim 22, further comprising:

a bearing plate disposed remote from said resonator plate, said bearing plate being located within said resonator chamber;

an aperture within said bearing plate receiving said drive shaft;

means for positioning said drive shaft at both said drive wheel and said bearing plate aperture whereby said drive shaft is axially aligned between said drive wheel and said bearing plate aperture for further stability.

24. A noisemaker for bicycles and the like comprising:
- a housing including a shoulder;
- a resonator plate seated in said housing on said shoulder;
- spring compression means for biasing said plate against said shoulder;
- a resonator chamber extending from said shoulder, away from said housing;
- an aperture in said resonator plate;
- a drive shaft extending through said resonator plate aperture;
- means for rotating said drive shaft;
- at least one cam follower positioned along an underside portion of said resonator plate;
- a cam operatively connected to said drive shaft by a cam shaft;
- said cam being positioned so that upon each rotation of said drive shaft said cam follower is impacted by said cam, thus urging said cam follower upward to provide for raising of said resonator plate, and said cam follower is released as said cam passes.

* * * * *

UNITED STATES PATENT AND TRADEMARK OFFICE
CERTIFICATE OF CORRECTION

PATENT NO. : 4,875,885

DATED : October 24, 1989

INVENTOR(S) : Horton Johnson

It is certified that error appears in the above-identified patent and that said Letters Patent is hereby corrected as shown below:

Column 6, Line 65:

"is" should be --to--

Signed and Sealed this

Sixteenth Day of April, 1991

Attest:

HARRY F. MANBECK, JR.

*Attesting Officer*   *Commissioner of Patents and Trademarks*